United States Patent
Costa et al.

(10) Patent No.: US 7,127,248 B1
(45) Date of Patent: Oct. 24, 2006

(54) USER REGISTRATION AND LOCATION MANAGEMENT FOR MOBILE TELECOMMUNICATIONS SYSTEMS

(75) Inventors: Mauro Costa, Pavia (IT); Emiliano Antonio Mastromartino, Milan (IT); Luca Salgarelli, Middletown, NJ (US); Sutha Sivagnanasundaram, Marlborough (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/089,765

(22) PCT Filed: May 20, 2000

(86) PCT No.: PCT/EP00/05705

§ 371 (c)(1), (2), (4) Date: Apr. 1, 2002

(87) PCT Pub. No.: WO01/31859

PCT Pub. Date: May 3, 2001

(30) Foreign Application Priority Data

Oct. 22, 1999 (EP) .................................. 99308340

(51) Int. Cl.
*H04Q 7/20* (2006.01)
*H04Q 7/24* (2006.01)

(52) U.S. Cl. ............... 455/435.1; 455/552.1; 370/338; 370/352; 370/466

(58) Field of Classification Search .. 455/435.1–435.2, 455/552.1, 553.1, 426.1, 436, 433, 414.1, 455/517, 432.1–432; 709/217, 218, 219, 709/227, 229, 249; 370/401, 338, 351, 352, 370/353–356, 328, 349, 466
See application file for complete search history.

(56) References Cited

U.S. PATENT DOCUMENTS

| | | | |
|---|---|---|---|
| 6,308,267 B1 * | 10/2001 | Gremmelmaier | 713/168 |
| 6,356,761 B1 * | 3/2002 | Huttunen et al. | 455/456.1 |
| 6,374,108 B1 * | 4/2002 | Jakobsen et al. | 455/432.1 |
| 6,466,571 B1 * | 10/2002 | Dynarski et al. | 370/352 |
| 6,477,644 B1 * | 11/2002 | Turunen | 713/161 |
| 6,487,406 B1 * | 11/2002 | Chang et al. | 455/422.1 |
| 6,571,289 B1 * | 5/2003 | Montenegro | 709/227 |
| 6,661,780 B1 * | 12/2003 | Li | 370/324 |
| 6,708,031 B1 * | 3/2004 | Purnadi et al. | 455/436 |
| 6,763,233 B1 * | 7/2004 | Bharatia | 455/433 |
| 2002/0026527 A1 * | 2/2002 | Das et al. | 709/245 |
| 2002/0049059 A1 * | 4/2002 | Soininen et al. | 455/439 |
| 2004/0002337 A1 * | 1/2004 | Wheeler et al. | 455/445 |
| 2004/0024901 A1 * | 2/2004 | Agrawal et al. | 709/238 |

OTHER PUBLICATIONS

XP-000750524, UMTS—the mobility part of broadband communications BT Technical Journal, Apr. 1998.
XP000752575 Mobility Support For IP over wireless ATM, IEEE Communications Apr. 1998.

* cited by examiner

*Primary Examiner*—Charles N. Appiah

(57) ABSTRACT

A method of use of a UMTS telecommunications network, comprising utilizing UMTS signalling to indicate changes in an IP sub-network. To register a Mobile Terminal (MT) or to update its location within the network, signalling relevant to the IP domain is transmitted with UMTS signalling in an integrated approach. This reduces the number of signalling messages that are required and minimizes delays.

10 Claims, 4 Drawing Sheets

USER REGISTRATION AND LOCATION MANAGEMENT FOR MOBILE TELECOMMUNICATIONS SYSTEMS

BACKGROUND OF THE INVENTION

This invention relates to user registration and location management for mobile telecommunications systems. In particular, it relates to Universal Mobile Telecommunications Service (UMTS) systems, when used to provide connectivity between an IP (Internet Protocol) capable end-device and an IP-based network.

When a UMTS user switches on his mobile terminal (I), the user needs to be registered with the UMTS network. Similarly, when the user moves around the area covered by the network, location management procedures need to take place in order to allow the user to be provided with services.

The initial registration process normally involves requesting for registration on the network, authentication of the user by the network, registration of the user and informing the home location register (HLR) of the users current whereabouts. This takes place at the UMTS level.

At the IP (Internet Protocol) level, there are three scenarios to consider when the user switches on an IP capable terminal. These are:

(1) the user has a static home IP address,
(2) the user requires a dynamic home IP address from the UMTS operator, and
(3) the user requires a dynamic home IP address from a body outside the UMTS domain.

In any case, a mobile IP registration with the home agent (HA) and perhaps the foreign agent (FA) needs to take place before the user can successfully engage in a data transaction using the Internet Protocol.

The current solution for the registration of data (IP) users in UMTS with mobile IP relies on the use of two, subsequent, registrations, the first at the UMTS level and the second at the IP level. This is shown in FIG. 1.

The user of a mobile terminal switches on his mobile terminal MT1 and requires registration with the UMTS network. He sends a message 2 requesting registration which passes through a radio network controller (RNC) 3 (which may also be the foreign agent (FA) for the IP protocol) to a switching centre with a visiting location register (VLR) 4. This in turn requests user information from any previous visiting location register 5 which the user may have last received service from, or from the user's home location register (HLR) 6. This sends back information concerning the user to the new VLR 4 and then an authentication request 7 and reply 8 are sent to and received from the mobile terminal 1. After this authentication, registration of the mobile terminal is complete and a register complete message 9 is sent to the terminal. Also, a message 10 is sent to the HLR informing the HLR of the new location of the terminal.

If IP registration is also required, then a further IP registration step also has to take place with conventional systems.

Once UMTS registration is complete, the mobile terminal 1 sets up a UMTS data channel 11. The mobile terminal 1 sends an FA router solicitation message 12 to the new RNC/FA 3 and this in turn sends an FA advertisement 13 back to the mobile terminal over the data channel. The mobile terminal then sends a registration request which passes through the RNC/FA 3 and onwards to the home agent 14. This then sends back a registration reply 15 to the mobile terminal and IP registration is complete. The foreign agent FA in IP is analogous to the VLR (visiting location register) in the UMTS domain.

Accordingly, two independent registration processes are necessary, first the UMTS registration and then the IP registration.

When a UMTS user moves around the area covered by the network, location management procedures need to take place in order to allow the user to be provided with services. Location management under a single radio network controller (RNC) does not affect the IP level. However, inter-RNC location updates have to involve IP level mobility as well as UMTS mobility. This is because it is assumed that mobile IP foreign agents (FA's) and RNC's are co-located.

Conventionally, an analogous process to the conventional method of registration has been done. Firstly UMTS location update is done and then, independently, a subsequent IP location update is done. This is shown in FIG. 2.

The location update procedures are similar in principle to the registration updates of FIG. 1, except that the location update 16 is required for both IP and UMTS, rather than register updates. Apart from this, the procedures involve similar steps, mutatis mutandis.

In both the user registration and location management scenarios, the complete separation of the two procedures for UMTS and IP bring inefficiencies in the usage of the air-interface, and delays to the overall registration or location update procedure.

The present invention arose in an attempt to reduce these inefficiencies and to reduce the time taken for the overall registration procedure or for the overall location update procedure.

It is known from the paper by Clapton A J et al entitled "UMTS—the mobile part of broadband communications for the next century", BT Technical Journal, GB, BT Laboratories, vol. 16, no. 2, 1 Apr. 1998, pages 120–131, XP000750524 ISSN=1358-3948 to provide a method for a mobile terminal in a UMTS and IP telecommunications network to register and/or update its location.

BRIEF SUMMARY OF THE INVENTION

The present invention is characterised over the disclosure of the Clapton paper by using UMTS messages to transmit IP information for IP registration and/or IP location update.

Mobile-IP specifications allow for link-layer mechanisms to be used to discover a foreign agent (FA) or to detect a change in the sub-network. In a preferred embodiment of the invention, accordingly, the UMTS level mobility-management (link-layer) is used for FA discovery.

More specifically, the method may comprise using UMTS 'register request' and 'register complete' messages for detecting FA information.

Preferably, additional fields of information are sent with the 'register request' message and with the 'register complete' message.

The fields which may be sent with the 'register request' message are: (1) type of home address, (2) type of COA (care of address), (3) home IP address, (4) home agents address, and (5) last used COA.

The additional field for the 'register complete' messages may be (1) home address, (2) COA type and (3) COA.

In further embodiments relating to location management, the UMTS 'location update' and 'location update complete' messages may be used.

Preferably, extra fields of information are provided in one or both of these messages. The fields which may be attached to the 'location update' message are: (1) home address, (2) COA type and (3) COA.

The extra fields which may be attached to the 'location update complete' message may comprise any of (1) type and (2) COA.

DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 3:
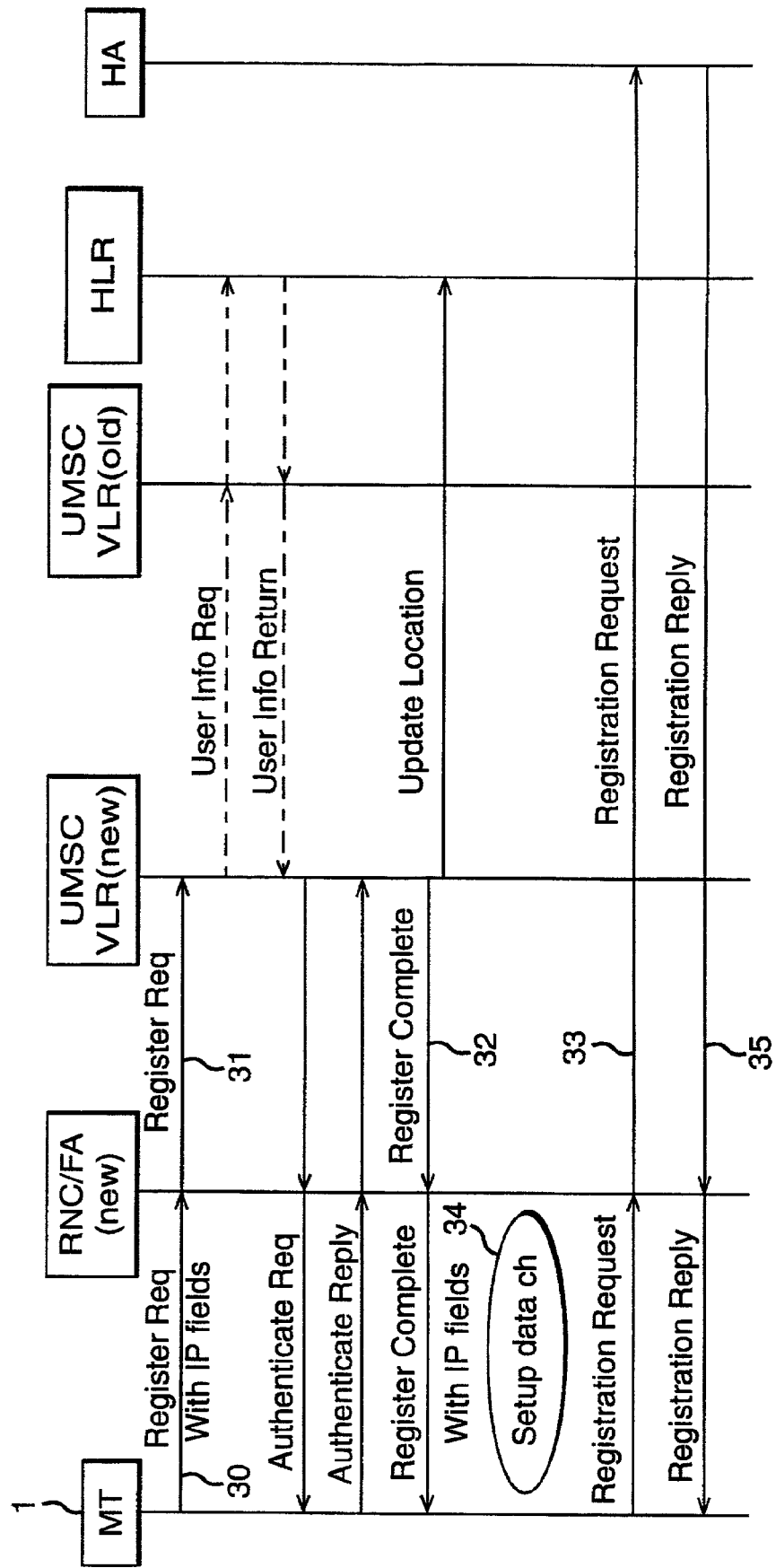
FIG. 3 shows an integrated registration procedure according to the present invention.

Referring to FIG. 3, in embodiments of the invention, the UMTS level mobility-management (link-layer) may be used for FA discovery. Accordingly, the UMTS 'register req' and 'register complete' messages are used for discovering the FA care-of-address (COA) or obtaining a co-located COA for a mobile terminal. Thus, in the Figure, when a mobile terminal 1 requires to register with a network, it sends out a modified register request message 30 with the addition of various IP related fields.

These fields are:
(1) type of home address
(2) type of COA
(3) home IP address (optional)
(4) home agents address (optional)
(5) last used COA (optional)

Note that if the mobile terminal 1 is not IP capable, then the additional fields are not used.

More particularly, the fields are the following:

(1) Type: this field identifies to the network if the mobile terminal 1 has a static address or requires a dynamic address from the UMTS operator, or requires a dynamic address from an entity outside the UMTS domain.
(2) Type of COA: this identifies if the mobile terminal is to use a co-located COA or a FA, the address in the COA field depends upon this setting.
(3) Home address: if the mobile is configured with a static home address, this field identifies that address. If the mobile does not have a statically configured home address, this field is omitted.
(4) Home agent: if the mobile has been configured statically with its home agent address, this field identifies it. Otherwise, this field is omitted.
(5) Last used COA: this field contains the mobile's last used COA, if any. Otherwise this field is omitted.

Figure 1:
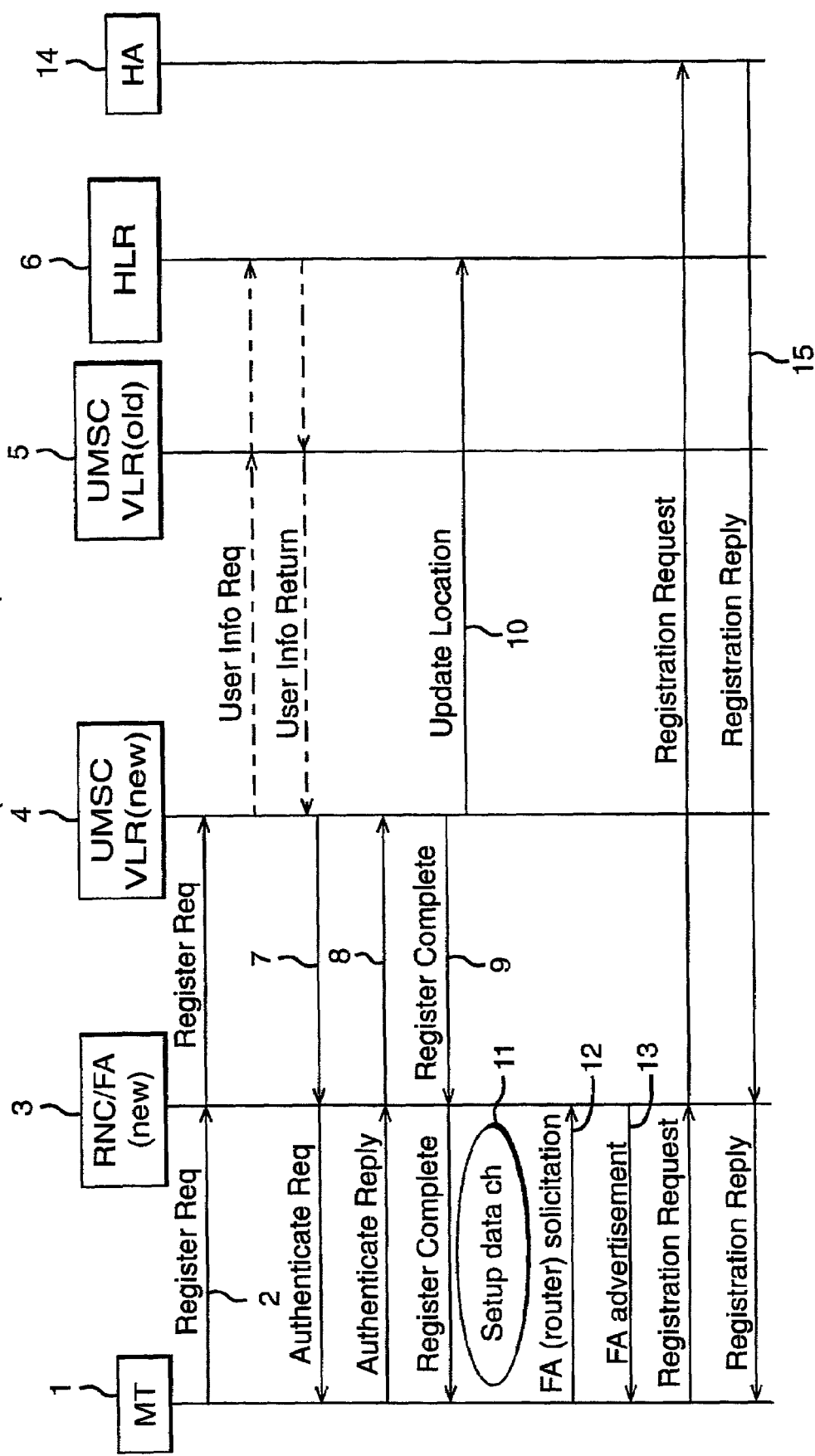
FIG. 1 shows UMTS and IP registration procedures according to the prior art.
Figure 2:
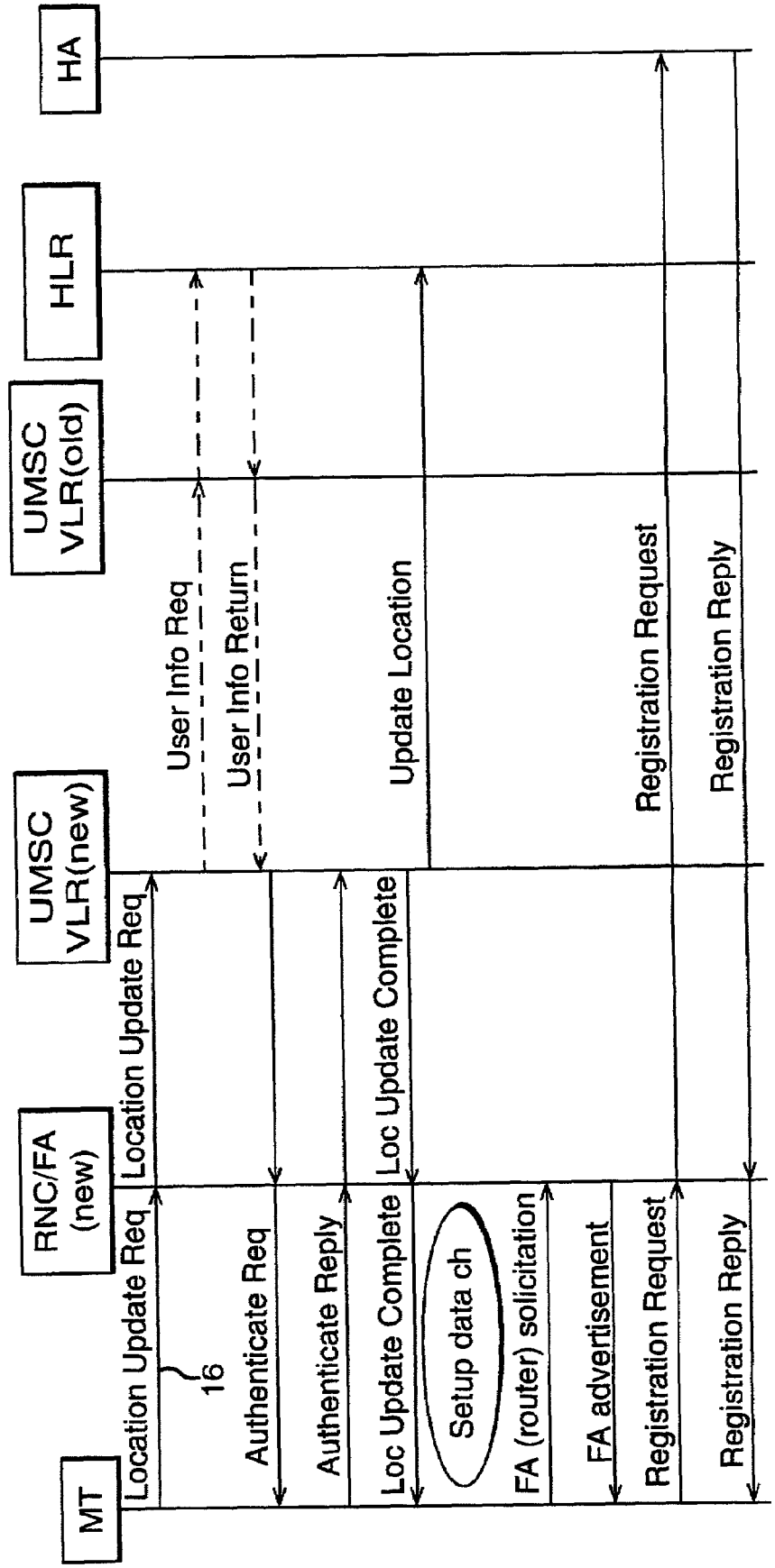
FIG. 2 shows UMTS and IP location update procedures according to the prior art.

The 'register req', with attached IP fields is functionally similar to the FA router solicitation 12 of FIG. 1.

The 'register complete' message is, from the IP perspective, the FA advertisement. The additional IP fields in the 'register complete' message are:

(1) home address: home address of the user
(2) type: the type of COA used at present, co-located or foreign agent (FA)
(3) COA: the COA.

If the user does not have a static address and the UMTS network could not obtain a home address for the user, then the user will be required to use IP level mechanisms to obtain one. The UMTS network will however, issue the user with the address of the FA or the co-located COA.

Subsequent to the register complete message 32, the mobile then uses a UMTS data channel to send a mobile-IP registration message 33 to the FA (or direct to the HA in case of a co-located COA). This procedure takes place at the IP level, where a data channel 34 is set up over the UMTS radio interface for carrying IP control messages. The HA (or FA) then transmits a registration reply message 35.

Figure 4:
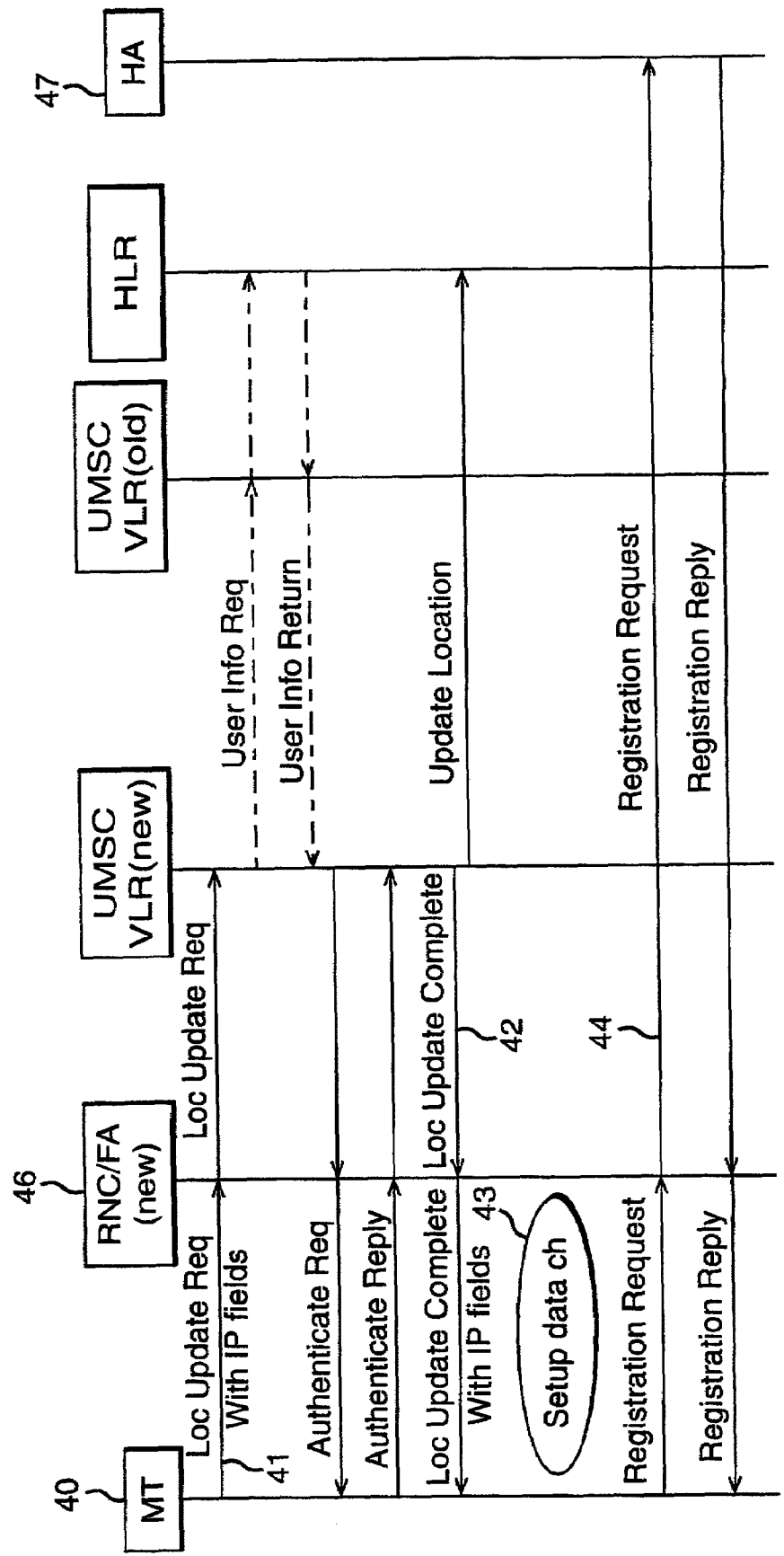
FIG. 4 shows an integrated location update procedure according to the present invention.

FIG. 4 shows an embodiment of the invention representing an integrated procedure for location management with mobile IP and UMTS. The procedure differs from that of the prior art in that the mobile terminal 40, in its 'location update request' transmission 41 also includes one or more extra fields. The fields are:

(1) home address: home address of the user
(2) type: the type of COA used at present, co-located or foreign agent (FA)
(3) COA: the COA.

An authentication routine then follows and, once the UMTS level location update is successfully completed, the RNC/FA checks whether a new COA needs to be issued. They can do this because of the information that was presented by the mobile terminal 40 in the 'location update request' message 41. If a new COA needs to be issued, it is attached to a "location update complete" message 42. The extra fields of information required within this message are (1) type and (2) COA. This message is used by the mobile terminal 40 at the IP level, as detection for mobile IP. A data channel is set up and the mobile terminal decides what it needs and whether it needs to do anything in relation to registering with a new FA and HA and this takes place at a registration request step 44. The mobile terminal registers either with a new RNC/FA 46 and with the home agent (HA) 47. If route optimisation is enabled, then the new FA will re-register the user at the old FA.

Embodiments of the invention accordingly allow a reduction in signalling messages that have to be transmitted across the air interface, during registration or during an inter-RNC location update, and minimise the delay required to complete such location updates. In effect, therefore, valuable network resources are saved and overhead is reduced.

Embodiments of the invention in general utilise UMTS signalling for detecting changes in the IP sub-network and integration of IP level signalling and UMTS level signalling. The invention may have wider use than the two specific scenarios described (user registration and location management) and may be applied to other scenarios where IP signalling is required.

Mobile IP information is sent during UMTS signalling for the reasons described above.

The invention claimed is:

1. A method for a mobile terminal in a UMTS and IP mobile telecommunications network to register its position by using UMTS 'register request' messages, and/or UMTS 'register complete' messages, to transmit IP information for IP registration.

2. A method as claimed in claim 1, wherein fields of information relevant to the IP domain are sent with the 'register request' message.

3. A method as claimed in claim 2, wherein the fields are: (1) type of home address, (2) type of care of address (COA), and, optionally, any of the following: (3) home IP address, (4) home agents (HA) address and (5) last used COA.

4. A method as claimed in claim 3, wherein additional fields of information are sent with the 'register complete' message.

5. A method as claimed in claim 4, wherein the additional fields comprise (1) home address, (2) COA type and (3) COA.

6. A method for a mobile terminal in a UMTS and IP mobile telecommunications network to update its location by using UMTS 'location update' messages, and/or UMTS 'location update complete' messages, to transmit IP information for IP location update.

7. A method as claimed in claim 6, wherein additional fields of information relevant to the IP domain are sent with the 'location update' message.

8. A method as claimed in claim 7, wherein the additional fields comprise (1) home address, (2) COA type and (3) COA.

9. A method as claimed in claim 6, wherein additional fields are sent with the 'location update complete' message.

10. A method as claimed in claim 9, wherein the additional fields comprise (1) type and (2) COA.

* * * * *